United States Patent
Donaldson et al.

(10) Patent No.: US 11,423,319 B2
(45) Date of Patent: Aug. 23, 2022

(54) EXPLAINING SEMANTIC SEARCH

(71) Applicant: Galiano Medical Solutions Inc., Calgary (CA)

(72) Inventors: Roger D. Donaldson, Vancouver (CA); Gregory K. Lancaster, Nanton (CA)

(73) Assignee: Galiano Medical Solutions Inc., Calgary (CA)

( * ) Notice: Subject to any disclaimer, the term of this patent is extended or adjusted under 35 U.S.C. 154(b) by 0 days.

(21) Appl. No.: 16/665,249

(22) Filed: Oct. 28, 2019

(65) Prior Publication Data

US 2022/0067557 A1 Mar. 3, 2022

(30) Foreign Application Priority Data

Nov. 15, 2018 (CA) .................................. CA 3024258

(51) Int. Cl.
| | | |
|---|---|---|
| *G06N 5/04* | (2006.01) | |
| *G06F 16/33* | (2019.01) | |
| *G06F 16/31* | (2019.01) | |

(52) U.S. Cl.
CPC ........... *G06N 5/045* (2013.01); *G06F 16/319* (2019.01); *G06F 16/325* (2019.01); *G06F 16/3347* (2019.01)

(58) Field of Classification Search
CPC .. G06F 16/3347; G06F 16/325; G06F 16/319; G06N 5/045
USPC ....................................................... 707/747
See application file for complete search history.

(56) References Cited

U.S. PATENT DOCUMENTS

| | | | |
|---|---|---|---|
| 2013/0060765 A1 | 3/2013 | Lin et al. | |
| 2015/0286643 A1 | 10/2015 | Girish et al. | |
| 2017/0374093 A1* | 12/2017 | Dhar | .................... H04L 63/1433 |
| 2020/0125590 A1* | 4/2020 | Ferrentino | ........... G06F 16/9538 |

OTHER PUBLICATIONS

Sevenstrup et al., "Hash Embeddings for Efficient Word Representations", Cornell University, https://arxiv.org/pdf/1709.03933.pdf, Sep. 12, 2017.
Tiia Leuhu, "Sentiment analysis using machine learning", Technical University of Tampere, https://trepo.tuni.fi/bitstream/handle/123456789/23136/leuhu.pdf?sequence=3, May 20, 2015.

* cited by examiner

*Primary Examiner* — Kimberly L Wilson
(74) *Attorney, Agent, or Firm* — Kyle R. Sattherwaite; Ryan W Dupuis; Ade & Company Inc.

(57) ABSTRACT

The invention uses document retrieval to explain to a human user the properties of a query object that are revealed by a machine learning procedure, lending interpretability to the procedure. A query object is compared to reference objects by transforming the query object and reference objects into representative tokens. Reference objects with many tokens in common with the query object are returned as relevant result objects by a document retrieval system. The token representation furthermore admits comparison between features of the query object and matched features of the reference object or between the query object and groups of reference objects having common features, thus emphasising characteristics of the query and reference objects of semantic importance to the user based on the intention of their search. Embodiments include retrieval of 2-dimensional or 3-dimensional images, audio clips, and text.

17 Claims, 6 Drawing Sheets

EXPLAINING SEMANTIC SEARCH

FIELD OF THE INVENTION

This specification relates to the explanation of machine learning calculations using document retrieval. Some embodiments relate to the interpretation of machine learning calculations on 2-dimensional or 3-dimensional images. Some embodiments relate to the interpretation of machine learning calculations on audio clips. Some embodiments relate to the interpretation of machine learning calculations on blocks of text.

BACKGROUND

It is often desirable to explain to a human user why a decision-making machine produces particular results. Sometimes results are not intuitive to a human user, and an explanation increases the confidence of the human that their machine is operating correctly; sometimes results are incorrect, and an explanation can help a human user modify their machine so that it can work correctly. Machine learning algorithms that make decisions can be complex and have opaque and uninterpretable inner workings: hence, their results are often difficult to reason about. Our invention addresses the interpretability of machine learning decisions made on a query object by identifying example objects relevant to the decision, and by highlighting relevant example features of the query object. Because instance objects are often available in large numbers, we leverage document retrieval methods to produce the relevant examples.

It is often convenient to represent complex objects, such as 2-dimensional or 3-dimensional images, audio clips, or blocks of text in some form more suitable for their comparison. For example, a computer image of an x-ray is a grid of pixels, and when compared directly to another x-ray image, a pixel-by-pixel comparison may not reflect their similarity. However, when the images are passed through a semantic mapping—a mapping that is sensitive to disease characteristics in x-ray images—and the mapped forms compared, two x-rays showing the same disease may indeed appear to be similar, and indeed, more similar to each other than to x-ray images showing different diseases. Although modern methods can generate semantic mappings, the mappings are typically based on large datasets, and it can be difficult to understand the reasons how differences and similarities are inferred by the mappings. This is particularly important where the mappings are imperfect, so that inferences are doubtful, and where a human user is available to judge results.

Thus, we address the problem of explaining similarity inferred by semantic mappings called embedding mappings. To evaluate the semantic similarity between two instance objects, it is often the case that a mapping is designed that computes a representation of instance objects in a Euclidean space, and the instance objects' semantic similarity is measured as the similarity between their corresponding representations. To be relevant to a variety of inputs, these types of mappings are typically trained to optimize accuracy over large sets of data. Semantic mappings are generated by means dependent on the type of data they are comparing. Semantic similarities for 2-dimensional images or 3-dimensional images might be generated by unsupervised methods such as variational auto-encoding, or supervised methods such as Siamese networks. Semantic similarities for audio clips and text can be generated by recurrent neural network auto-encodings. Semantic similarities between words can be represented by a word embedding such as Word2Vec. Each of these approaches represents complex objects in low-dimensional vector spaces such that the complex objects can be compared based on characteristics important to human perception. This list is by no means exhaustive, but does serve to characterise the ubiquity of semantic similarity measures across a great variety of domains.

We now define some terms used in this document. By "instance object" we mean the raw description of the objects we wish to compare. By "embedding mapping" we mean a mathematical operation that takes an instance object as input and produces a point in Euclidean space as output. By "embedding representation" we mean a point in Euclidean space that is the output of an embedding mapping applied to an instance object. By "embedding space" we mean the entire collection of embedding representations under the embedding mapping from a collection of instance objects.

The embedding mappings framework can be applied to predict similarity over a wide range of instance objects yet may produce results that are difficult for a human to interpret. For example, the instance objects may be 2-dimensional or 3-dimensional images, and the embedding mapping is designed to produce similar Euclidean points from two images if they contain similar features. However, were each similar image to depict a collection of several features, the practitioner would be left wondering which of the image features is important in concluding image similarity. As another example, the instance objects may be audio samples of speech: were two samples to be gauged similar according to an embedding mapping the practitioner would be left wondering which utterances in each sample contributed to their similarity. As a third example, the instance objects may be blocks of text: an embedding mapping might be trained to determine two text blocks similar if they both represent a positive or both represent a negative opinion of a subject. Were two such blocks of text judged similar, without explanation, a practitioner might be left wondering which particular words or phrases in the text contributed to their assessed similarity.

One important context in which the need to explain similarity between embedded objects arises is in document retrieval, where the documents to be retrieved are the instance objects themselves. In this context, the practitioner is the end-user as they evaluate search results with respect to their relevance. Analogous to a search over keywords that highlights search terms in the result, a search user benefits from an object similarity search that highlights components of the query object that are important to matching their top result objects.

A second context where similarity between embedded objects is important is in probing the nature of the embedding mapping itself. It is often the case that a practitioner will want to evaluate the embedded form of an object by computing its similarity to a well-understood set of reference objects. In this case, the present invention can be applied by determining pertinent features of the query object with respect to an arbitrary embedding space.

Both of these contexts are supported by standard methods in document retrieval. Document retrieval database systems are designed to return instance objects that are relevant to a query. These database systems ingest instance objects and provide an indexing scheme so that the instance objects can be found again quickly. When a user searches for instance objects by issuing a query, the document retrieval database returns objects that are relevant to the query.

An example of a document retrieval system is the index of a book. A user wishing for information on a topic looks for a word representative of their query topic in the book index. The user then refers to pages of the book listed with their query word to retrieve the information. Electronic versions of document retrieval systems are similar in principal, except that the index—the list of terms available for query—is much larger and more exhaustive than a book index, and complex queries (such as finding a page with two specific words) are possible. Electronic document retrieval systems make the same trade-off as physical indexes such as the book index: these systems pre-process instance objects at the expense of up-front time and storage space so that instance objects may be retrieved quickly when a user issues a query.

Our invention uses these same database structures, namely the indexing and pre-processing schemes, but in a different way: we use an instance object as the query itself. This would be analogous to using an entire page rather than a few words as a query for finding semantically similar pages in a book. The result objects therefore give a context for the query object, and about the method by which the query object is retrieved. When a machine learning method is used to create the embedding mapping that in turn indexes the instance objects, this contextual information serves as an explanation of that underlying machine learning representation of the instance objects.

The need for explanations of machine learning and artificial intelligence calculations is not new. Early work in logical reasoning systems includes explanation-based reasoning that not only produces conclusions, but also the intermediate reasoning process, subsequently highlighting the inputs important to affecting the machine's conclusions. Decision trees are often favoured by practitioners for their interpretability. Bayesian networks perform reasoning probabilistically through a collection of separate connected modules that can be probed for their response to different inputs. Classical image and voice analyses use hand-built feature detectors that have interpretable responses. However, although the development of Artificial Neural Networks (ANNs) has generated families of non-parametric functions that predict the statistics of very large datasets with excellent accuracy, this performance comes often at a cost of not being able to naturally interpret why ANNs generate the outputs that they do.

In the case where the instance objects are images and a Convolutional Neural Network (CNN) is trained to classify the images, there are methods for highlighting the parts of each image that are most important to the CNN's classification decision. CNNs are complex functions that pass image information up from one layer to the next, the subsequent upper layers having generally lower spatial resolution than the early lower layers. A final layer combines the lowest resolution output to make a prediction about the class of the image being considered. The family of Class Activation Mappings (CAM) examine each spatial resolution—particularly the penultimate low-resolution layer—to highlight the areas of the image important to the CNN's classification decision. "Black box" methods, such as Randomized Input Sampling for Explanation (RISE), do not require access or knowledge of internal machine learning function processes to highlight influential image regions, though their results are not presented in context of example reference images.

There continues to be development in the representation of instance objects, often with the aim of transforming these objects in a data-driven manner to a simple Euclidean space where the semantic properties of objects may be compared using Euclidean distance and dot products. Examples of such transformations include bottleneck and variational auto-encoders, and Siamese networks. These transformations tend to apply to signals such as audio clips and 2-dimensional and 3-dimensional images. More abstract embedding mappings, such as the word2vec embedding mapping for word meanings, can cast words into a single embedding representation for synonym, antonym, and analogy comparison. Similar word embedding mappings can even provide translations between different languages by casting different languages into the same Euclidean embedding space.

One way to marry these vector embedding mappings with a document retrieval system is to use a Locality Sensitive Hash (LSH) function. The LSH family of algorithms take Euclidean vectors as input and produce tokens as output. LSH theory predicts that objects that have many [few] tokens in common are similar [different] in the embedding space, and therefore similar [different] in a semantic sense. In applying LSH to document retrieval, the document retrieval database system can index each object based on the LSH tokens it has and when matching a query object to the reference objects, can compute similarity as the relevance score of each result object to the query object. Locality sensitive hash has been studied by many authors and is the subject of a review. The specific LSH method used in one of our embodiments is published both in an introductory paper, and in a paper detailing its analysis.

PRIOR ART

As we imply in the above background, our invention is precedented on previous works from a variety of areas of study. We survey the relevant academic and patent literature in the sequel.

Academic Literature

Schütze, Hinrich, Christopher D. Manning, and Prabhakar Raghavan. "Introduction to information retrieval". Chapter 2. Cambridge University Press, 2008. Describes the fundamentals of the inverted index for efficient document retrieval.

Cover, Thomas, and Peter Hart. "Nearest neighbor pattern classification." IEEE transactions on information theory 13.1 (1967): 21-27. Seminal paper on k-nearest neighbour classification.

Andoni, Alexandr, and Piotr Indyk. "Near-optimal hashing algorithms for approximate nearest neighbor in high dimensions." Foundations of Computer Science, 2006. FOCS'06. 47th Annual IEEE Symposium on. IEEE, 2006. Review of locality sensitive hash functions.

Datar, Mayur, et al. "Locality-sensitive hashing scheme based on p-stable distributions." Proceedings of the twentieth annual symposium on Computational geometry. ACM, 2004. Introduction of locality sensitive hash functions that use thresholding.

Donaldson, Roger, et al. "Random mappings designed for commercial search engines." arXiv preprint arXiv:1507.05929, 2015. Analysis of locality sensitive hash functions that use projections onto Gaussian vectors with simple thresholding.

Tishby, Naftali; Pereira, Fernando C.; Bialek, William (September 1999). The Information Bottleneck Method (PDF). The 37th annual Allerton Conference on Communication, Control, and Computing. pp. 368-377. Generating embedding mappings using bottleneck autoencoding.

Kingma, Diederik P., and Max Welling. "Auto-encoding variational Bayes." arXiv preprint arXiv:1312.6114, 2013. Generating embedding mappings using variational autoencoding, a method descended from bottleneck autoencoding.

Bromley, Jane, et al. "Signature verification using a 'siamese' time delay neural network." Advances in neural information processing systems. 1994. Siamese networks, which are a class of artificial neural networks, for generating embedding mappings.

Mikolov, Tomas; et al. "Efficient Estimation of Word Representations in Vector Space". arXiv:1301.3781, 2013. A particular embedding mapping where the instance objects are individual words.

DeJong, Gerald, and Raymond Mooney. "Explanation-based learning: An alternative view." Machine learning 1.2 (1986): 145-176. An early attempt at interpretability in machine learning for logic-based decision systems.

Zhou, Bolei, et al. "Learning deep features for discriminative localization." Proceedings of the IEEE Conference on Computer Vision and Pattern Recognition. 2016. A modern attempt at interpretability that uses knowledge of the inner workings of a convolutional neural network to highlight regions of interest in an image.

Petsiuk, V., A Das, and K. Saenko. "RISE: Randomized Input Sampling for Explanation of Black-box Models". arXiv:1806.07421, 2018. A recent attempt at interpretability that applies an embedding mapping on randomized instance objects to highlight regions of interest in an image.

Patent Literature

Brinker, Klaus et al. "Document clustering that applies a locality sensitive hashing function to a feature vector to obtain a limited set of candidate clusters." U.S. Pat. No. 7,797,265. A locality-sensitive hash function-based method for finding similar result objects based on a query object.

Ma Yanjun, Liu Jiachen and Wu Hua. "Artificial intelligence-based search result aggregation method and apparatus and search engine." Chinese Patent Application CN106096037A. A method for grouping result objects based on query words.

Yang Song, Charles J. Rosenberg, Andrew Yan-Tak Ng and Bo Chen. "Evaluating image similarity." U.S. Pat. No. 8,831,358 B1. A specific method for determining the similarity between a query image and a reference image.

Yu, Cui, Beng-Chin Ooi, and Kian-Lee Tan "Transformation-based method for indexing high-dimensional data for nearest neighbour." U.S. Pat. No. 6,834,278 B2. A specific method for creating an inverted index for images so that they can be found quickly.

Mojsilovic, Aleksandra, Bernice Rogowitz, and Jose Gomes. "System and method for measuring image similarity based on semantic meaning." U.S. Pat. No. 7,043,474 B2. One of several inventions that create specific tokens for comparing images. This invention creates tokens that are interpretable so although this invention only applies to 2-dimensional images, it does produce interpretable result objects.

Fabian Moerchen, Fabian, Klaus Brinker and Claus Neubauer. "Relevance ranking for document retrieval." US Patent Application 20080208847 A1. A method for sorting the output of a document retrieval search such that the documents most relevant to the user appear at the top of the result list.

Periaswamy, Senthil, et al. "Systems and methods for identifying suspicious anomalies using information from a plurality of images of an anatomical colon under study." U.S. Pat. No. 8,213,700 B2. A method for classifying a medical image by comparing it to a database of other medical images, where the images are indexed based on interpretable features.

SUMMARY

Our invention provides methods, non-transitory computer-readable media storing thereon statements instructions executable to perform said methods, and document retrieval systems comprising a data processing apparatus having at least one processor for executing said statements and instructions, at least one data storage device in which a document retrieval database is maintained, at least one input device and at least one presentation device. The executed methodology helps a user interpret the result of a machine learning operation using said document retrieval database. The system compares a query object to a collection of reference objects which are the results of a similarity search performed on said database. The result objects provide insight into which features of the query object are captured by the similarity function and thus are important to the comparison. For example, if the instance objects are images, features that many result images have in common with the query image can be interpreted as important features of the query image according to the similarity function. When the algorithm that determines similarities between query and reference objects is complex, it is often difficult to understand reasons for the similarity judgements. To continue the image example, if the images are x-rays, when an x-ray of a patient with pneumonia is the query, and the result objects are a variety of x-rays, all with the same age and gender as the patient, a user could deduce that their similarity algorithm is good at matching patient age and gender but is insensitive to the types of diseases their x-rays depict.

Our invention further extends this explanatory use of a document retrieval database to the case where reference objects have been labeled by an oracle. In this case a user would like their query object to be labeled, and to know why the label is appropriate. The query object is input to the document retrieval system, and the result objects returned from the similarity search are grouped into result sets according to their labels such that all the result objects in each set share the same common label. The labels of the result sets are used as suggested labels for the query object, and the confidence of each suggestion is a function of the similarities of the result objects in each result set to the query object. The commonalities of the result objects in each result set relative to the query object inform the user as to the reason each label is inferred for the query object. The human user can then use their own judgement to decide whether each suggested label makes sense for their query object.

For example, we again suppose that the image objects are x-rays of patients. The query image is an x-ray of a patient, and the most similar results include the x-rays of two sets of patients, some known to have pneumonia and others known to have emphysema. In this case, a practitioner will look at both sets of x-rays, each suggestive of blockage in the lungs. A final comparison on the part of the practitioner will help them decide which of the two diagnoses is correct, thus helping the practitioner while not taking the final decision out of their hands. Furthermore, the practitioner has an explanation for why the underlying similarity function produces good matches to the query x-ray based on the observed filamentary lung patterns.

In a further embodiment, our invention highlights for users the features of the query object that contribute to it matching the result objects, and further contribute to its suggested labels when result objects are grouped by their label. This highlighting embodiment, called differential highlighting, replaces the query object with slightly modified versions of the query object to gauge the sensitivity of the document retrieval process to different features of the query object. Features of the query object to which the collection of result objects are most sensitive are interpreted by the user as important to the matching algorithm.

In our x-ray example, suppose that the query is the chest x-ray of a patient that appears healthy. Then, suppose that a set of x-ray images of patients known to have cancerous lung nodules matches the query well. From this, a user might infer that "lung nodule" is a good label for the query patient x-ray, but may not understand the reason for this inference. Differential highlighting can show why the seemingly healthy patient x-ray is labeled as diseased by indicating areas of the query x-ray that are important to its similarity to x-rays in the lung nodule set. Those areas may themselves be candidate areas of the query x-ray that are indications of a disease that might otherwise be missed, or they may be simply areas of the query patient's x-ray that bear physiological similarity to lung nodule patients for benign reasons. Differential highlighting gives appropriate explanation of the machine-learned similarity for the practitioner to judge the reasons for the machine's determination.

The highlighting embodiment is particularly useful when the embedding representation of any instance object can be computed, but where the embedding mapping cannot be written in closed-form and cannot be inverted. This situation is typical, for example, of embedding mappings that are trained from data, such as an auto-encoder.

Although the instance objects used in the examples above are images, the reader will appreciate that the techniques described herein can be extended to a large class of objects, the constraint being that we must have available a mapping that takes an object as input and produces a list of tokens as output: objects with many common tokens will be considered similar, this notion of similarity between objects being therefore dependent on the chosen mapping. The mapping can be complex, may well be the result of a machine learning procedure, and the user may thus have little insight into similarities between objects consequential to the mapping without some form of explanation.

DETAILED DESCRIPTION

The invention is comprised of a document retrieval system and methodology having a database component and a presentation component. The presentation component is different for different embodiments. We begin by describing how instance objects are stored in the document retrieval database, then describe the presentation embodiments for grouping result objects into sets, and for highlighting features of the query object.

Explanation by Document Retrieval

Figure 1:
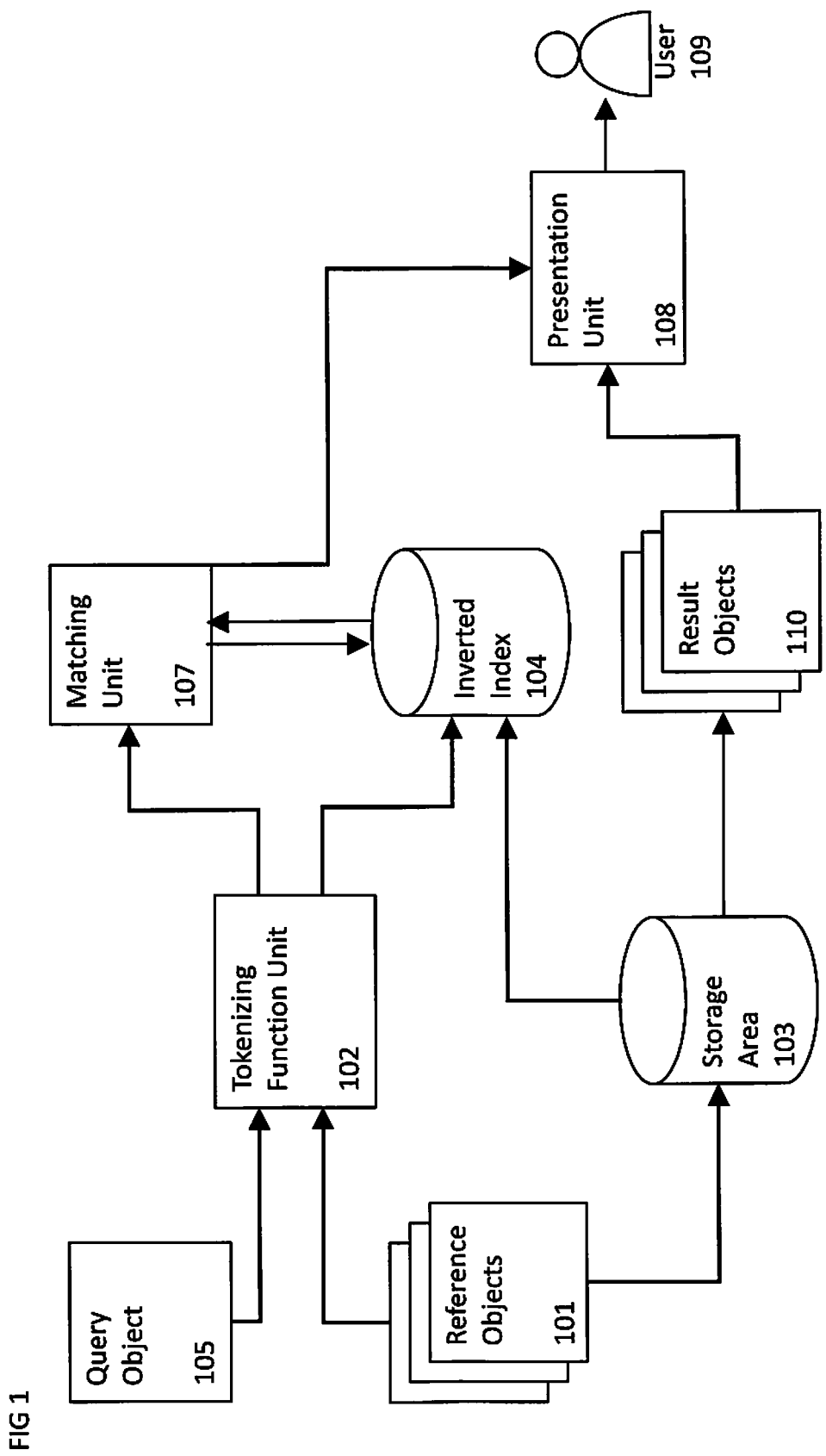
FIG. 1 depicts the relationship between components that use an inverted index for retrieving reference objects based on a query object.

The primary functional components of the document retrieval system and methodology are a tokenizing function unit, an inverted index, a matching unit, and a presentation unit, each of which may be implemented in the form of a respective set of statements and instructions stored on the non-transitory computer readable media of the system for execution by the one or more computer processors thereof to perform the respective tasks attributed to these units in the description below. The present invention is particularly concerned with the novel application of the document retrieval database for the purpose of explaining the behaviour of the underlying tokenizing function. FIG. 1 depicts the document retrieval database. Reference objects 101 are ingested individually or in batches by the tokenizing function 102. The tokenizing function calculates the tokens for each of the reference objects. The reference objects are stored in a data storage area 103. The address of each reference object within the data storage area is sent along with the reference object's tokens to the inverted index 104. For each reference object, an entry is made in the inverted index for each of its tokens. If the token does not exist in the inverted index, the token is entered into the database and associated to a singleton list containing the reference object's address. If the token does exist in the inverted index, the reference object's address is appended to the token's associated list.

To evaluate a query object 105, the query object is processed by the tokenizing function to generate query tokens. These query tokens are sent to the matching unit 107 which queries the inverted index and retrieves copies of the lists of reference object addresses associated with each of the query tokens. The matching unit scores each of the reference objects found in each of those retrieved lists according to a count of the number of retrieved lists in which each reference object appears. The reference objects appearing in the lists are called the result objects. In some embodiments, the score of each result object is the count of lists in which the reference object appears. In other embodiments, the score of each result object is determined by a scoring function that accounts for the number of result objects that have each token, such as the well-known TF-IDF or Okapi BM25 scoring rule. The addresses of the result objects and their scores are sent to the presentation unit 108. The presentation unit retrieves facsimiles of the addressed reference objects from the storage area for rendering to the user 109 via the presentation device, which in one non-limiting example may comprise a display screen; another non-limiting example may comprise an electronic audio speaker.

Figure 2:
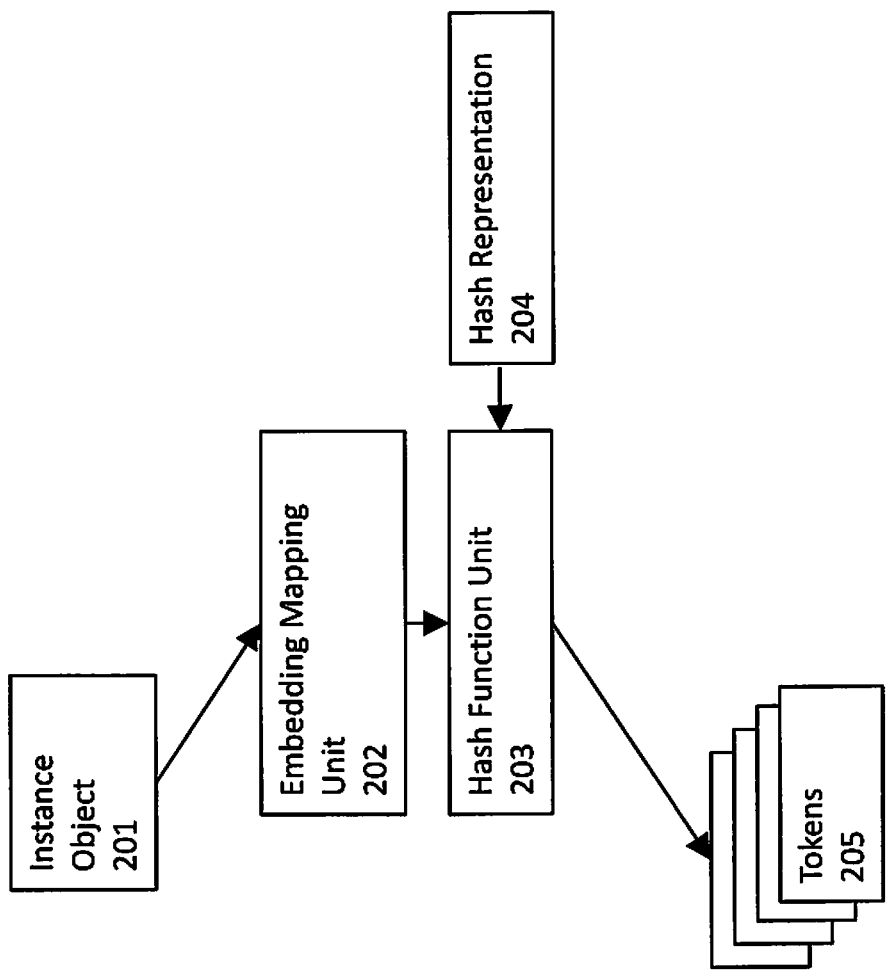
FIG. 2 depicts the components of one embodiment of a tokenizing function, namely, a tokenizing function that is composed of an embedding mapping and a hash function.

In some embodiments, the tokenizing function is composed of an embedding mapping and a hash function. FIG. 2 shows the relationship between these components. Upon receiving an instance object 201, the embedding mapping 202 unit computes an embedding representation. The embedding mapping unit is designed such that two instance objects having embedding representation with a large dot product are similar in some semantic sense. The embedding representation is sent to the hash function unit 203, which computes tokens 205 characteristic of the original instance object. In embodiments that highlight certain query object features, the hash representation 204 which represents properties of the hash function is explicitly stored.

In one embodiment, the hash function is a particular Locality Sensitive Hash (LSH) function called the linear mapping with simple thresholding. We assume that the embedding mapping $F:X \to \mathbb{R}^d$ is a fixed function of the object space X, and that the similarity between two vectors in Euclidean embedding space, $u, v \in \mathbb{R}^d$, is given by their dot product $u^T v$. Function F might be, for example, the output of a machine learning process. We furthermore assume that each embedding representation has a length of one in the Euclidean norm. Our hash function is represented by a list of m vectors $a_t \in \mathbb{R}^d$ where each element of each of these vectors is an independent random sample of a Gaussian random variable with mean zero and variance equal to one. The tokens for the instance object are then generated as follows: A threshold h is chosen. For each $t \in [1, m]$ we compute $a_t^T F(x)$. Tokens t for which this quantity is greater than h are added to the list of tokens for instance object x. The Gaussian vectors $\{a_t\}$ although random, are never changed once they are chosen. In FIG. 2, these random vectors comprise the hash representation 204.

The presentation device presents at least some of the result objects to the user in context of the query object. In one non-limited example, the presentation device displays the result objects alongside the query object on display screen. The precise complement shown by the presentation device is different for different embodiments. The presentation device may simply present a selection of the highest scoring result objects to the user alongside the query object. Three other possible classes of embodiments are those that present grouped sets of the result objects, those that highlight features of the query object, and those that do both. In the example where the presentation device is a display screen, the highlighted features might be shown at a brighter or uniquely coloured illumination with respect to non-highlighted areas of each result object; in the example where the presentation device is an audio speaker, highlighted features might be loud with respect to non-highlighted areas of each result object.

Explanation by Grouping

In embodiments where reference objects are labeled, result objects can be grouped by their labels into result sets. Labels are usually supplied alongside the instance objects, the labels having been applied by an oracle that knows what the object represents. Each instance object may have more than one label. In this case, the instance objects are suitable data for supervised learning. Grouping the reference objects that are most similar to an unlabeled query object will be recognized as an intermediate step in k-nearest neighbour (k-NN) classification, where the label of the result set containing the greatest fraction of k top result objects, k being a fixed integer, is reported to the user as the label of the query object. In k-NN classification, only one label is reported to the user. In our case, we do not consider a fixed number of k most relevant results, but we report the labels of several top scoring sets of result objects to the user. A collection of at least some top scoring result objects from the top scoring result sets are presented to the user, for example, by compiling a top-scoring subset of result objects from each of said top scoring result sets. This presentation technique provides context based in example reference objects to help the user understand why each top scoring result set—hence each corresponding label—is rated a candidate label by the underlying similarity function.

In one embodiment, our invention scores each result set using foreground-background scoring of the tokens of the result set's result objects. Foreground-background scoring has two steps: The first step calculates the strength of each token within each set. The second step combines the strengths of all of the set's tokens into a score for the set. In the first step, we set $n_{tg}$ as the number of result objects with token t in result set g, and $n_g$ as the number of result objects in the result set. We set $n_t$ as the number of instance objects with token t in a background set of instance objects, and n as the total number of background instance objects. In one embodiment, the foreground-background strength for token t in result set g is $$s_{tg} = \frac{n_{tg}/n_g}{n_t/n}\left(\frac{n_{tg}}{n_g} - \frac{n_t}{n}\right).$$

Other foreground-background strengths are possible, the idea being that tokens that are over-represented in the result set relative to their representation in a background set of objects have large strengths. In one embodiment, the background set is the entire collection of reference objects; in another embodiment, the background set is the collection of all result objects for the query.

The strengths of the tokens in each result set are combined into a score for the result set by taking a mean of the token strengths. Embodiments where the mean is the arithmetic mean, or the geometric mean, or the harmonic mean are all possible. Embodiments where the mean is taken over a fixed number of top strength tokens for each result set is also possible. After scoring each result set, one embodiment returns all result sets for presentation to the user; while another embodiment returns only a fixed number of top scoring result sets for presentation to the user.

Figure 3:
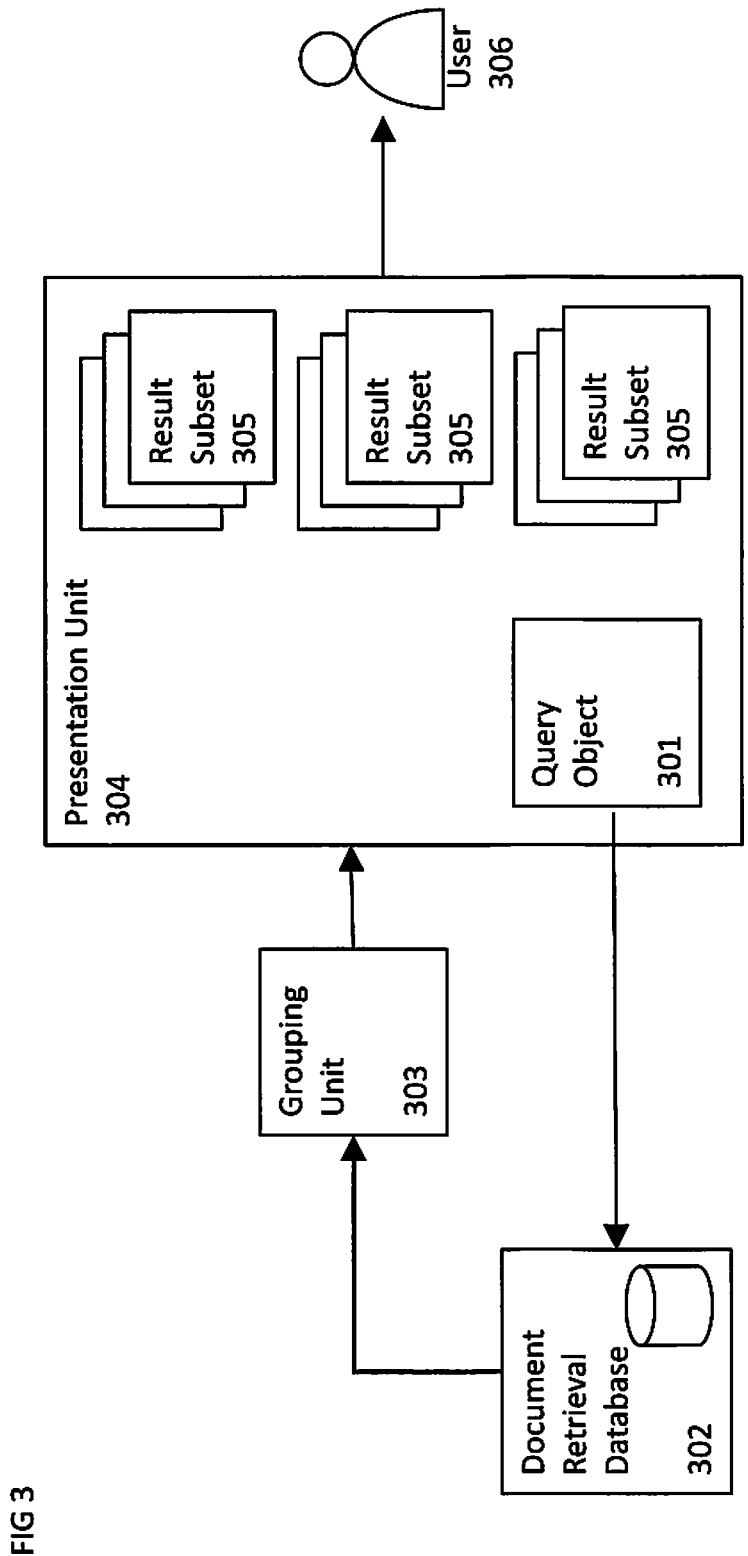
FIG. 3 depicts an example of how result objects that are grouped might be presented to a user.

FIG. 3 depicts an example of how result objects that are grouped by label might be presented to a user. A query object 301 is input to the document retrieval database 302 and its top result objects are returned, just as is depicted in FIG. 1. The grouping unit 303 groups the result objects according to their labels and computes a score for each result set 305. In this embodiment, every result set is a collection of result objects all having a label in common. Via the presentation device, the presentation unit 304 presents the top scoring subset of result objects from each result set as well as each result set's label. This presentation format provides the context to the user 306 such that the user can observe similarities within each result set that explain the result set's label, and similarities between the result set's result objects and the query object that explain the applicability of the result set's label as a candidate label for the query object.

Explanation by Highlighting

In a further embodiment, our invention highlights features of the query object that are important to it matching a result object or objects using a technique called differential highlighting. Differential highlighting makes small modifications to the query and measures its effect on the similarity calculation. Modifications that effect the similarity profoundly are deemed important to the query object's similarity to the result object or objects, and these important modifications are aggregated and presented to the user in the context of the query object. This contextual presentation provides an explanation to the user as to why the underlying similarity calculation makes its particular judgements. In this further embodiment, it is assumed that the tokenizing function is a composition of an embedding mapping and a hash function as described above and depicted in FIG. 2.

In one embodiment, the instance objects are 2-dimensional or 3-dimensional images and the modifications are luminance perturbations of small regions of the image. Further, if we suppose that an image is a query object, and it is compared to result sets of labeled result objects as we describe above, then differential highlighting explains which regions of the query image are important to it being similar to each of the candidate labels. For each candidate label, the query image could be overlaid with the sum of the image regions most sensitive to matching the query with each result set label.

The computational framework for differential highlighting is as follows: As above, we assume that the embedding mapping $F:X \to \mathbb{R}^d$ is a fixed function of the instance object space X, and that similarity between two vectors in embedding space, $u, v \in \mathbb{R}^d$, is given by their dot product $u^T v$. Mapping F might be, for example, a function trained on a large dataset by a machine learning process. We wish to compare our query object x to a reference vector u in the embedding space as the size of $u^T F(x)$; if $u=F(y)$, then this dot product compares query object x to a reference object y. Either way, differential highlighting estimates which perturbation $\delta x$ to the original query object causes the greatest increase in $u^T F(x)$. That is, differential highlighting optimizes $$\max_{\delta x \in S} u^T DF(x) \delta x,$$
$$\|\delta x\| \leq \epsilon,$$

where $\delta x$ is constrained to S, a subset of X, and is constrained to have small but non-zero size $0 < \epsilon < \infty$. Often, the Jacobian $DF(x)$ is not known or does not exist, in which case, differential highlighting solves the approximate problem $$\max_{\delta x \in S} u^T (F(x + \delta x) - F(x)),$$
$$\|\delta x\| \leq \epsilon,$$

which requires only the forward calculation of F itself.

In embodiments where X is a vector space, it is often convenient to constrain $\epsilon x$ to a linear subspace parameterized by coefficients $\{\alpha_s\}$ so that $$\delta x = \sum_s \alpha_s \delta x_s.$$

In this case, we approximate the maximal perturbation, parameterized as $\alpha_s^* = u^T(F(x+\delta x_s)-F(x))$. The optimal perturbation $\delta x^* = \Sigma_s \alpha_s^* \delta x_s$ is then returned to the user in context of the original object x. Because $\delta x^*$ is an object in the same space as the query object, both the perturbation and the query can be represented to the user by the same interface, making it easy for the user to make a direct comparison between the two, therefore relying on the optimal perturbation as an explanation for the relationship between x and the reference embedding representation u.

When X is a subset of a Euclidean space $\mathbb{R}^n$, it is further typical for each perturbation $\delta x_s$ to be characterized as $\delta x_s = x$ $\delta m_s$, where differential mask $\delta m_s \in X$ is a small multiplier applied element-wise to the original query. In this case, the optimal mask $$\delta m^* = \sum_s \alpha_s^* \delta m_s$$

can be overlaid with respect to the original query to highlight its elements that are most important in explaining its similarity in embedding space to reference vector u. In an embodiment where X is a space of 2-dimensional or 3-dimensional images, for example, displaying $\delta m^*$ as an image overlay of the original image query x would highlight pixels of the original query that explain its similarity in embedding space to reference vector u.

Different embodiments have different specifications of the reference vector u. In one embodiment the reference vector u is the embedding representation resulting by applying the embedding mapping to a top scoring result object. In another embodiment, the reference vector is the average of the embedding representations of several top scoring result objects. In another embodiment, the reference vector is the average of the embedding representations of the top scoring result objects of a particular labeled result set. This embodiment combines explanations from comparing query objects to labeled result objects with explanations from highlighting features in query objects to provide the user with a comprehensive explanation for the reasons their underlying similarity function predicts the candidate label.

Some embodiments specify the reference vector as intermediaries in locality sensitive hashing. In one embodiment, the hash function is the linear transform with simple thresholding, and the reference vector is the random vector $\{a_t\}$ corresponding to token t. This embodiment highlights features of the query object that are important to having token t. This embodiment can be extended by combining feature highlights from all tokens that determine matches to a particular result object or set of result objects.

Figure 4:
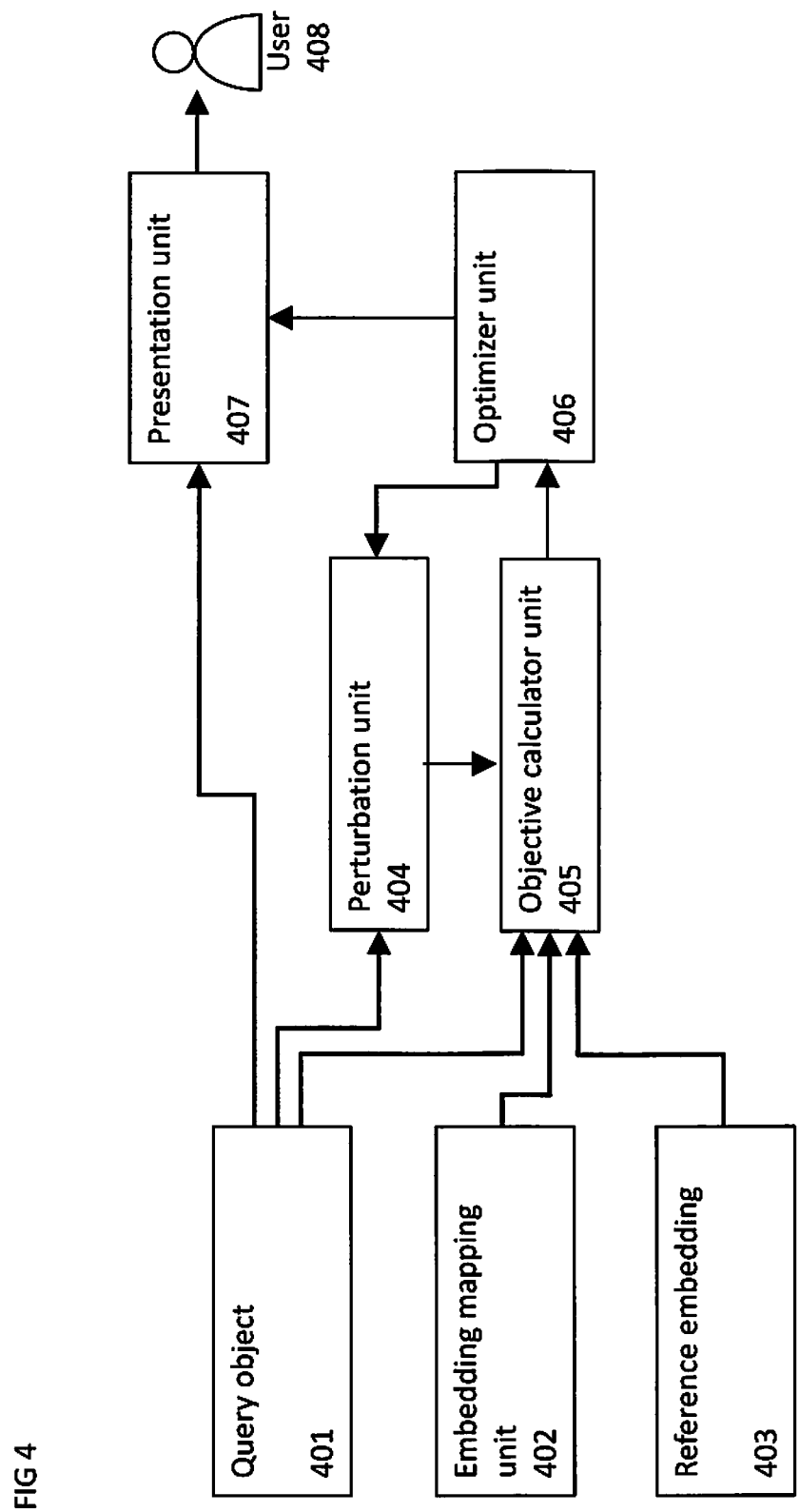
FIG. 4 depicts how the invention calculates the differential highlights of a query object with respect to a reference.

Given this framework, we now describe the operation of differential highlighting. In one embodiment, as depicted in FIG. 4, the instance object space is arbitrary, and we interpret the perturbed instance $x+\delta x$ to mean a small modification of the original query x. In the embodiment of FIG. 4, the query object 401, the embedding mapping 402, the reference embedding representation 403 and the perturbation unit 404 provide their respective information to the objective calculator 405. The query object is optionally fed to the perturbation unit. The optimizer 406 prompts the perturbation unit to supply a perturbation of the original query object to the objective calculator. The objective calculator sends its result and the perturbed query, to the optimizer. The optimizer records the value from the objective calculator and the perturbed query, then prompts the perturbation unit to provide a new perturbation. This process repeats until the optimizer has a satisfactory maximum objective value, or the perturbation unit has exhausted all possible perturbations, or if the optimizer has made some maximum number of attempts. The optimizer sends the perturbed query associated with the largest objective value to the presentation unit 407 which presents the optimal perturbed query and, optionally, the original query, to the user 408 via the presentation device.

As an example of how differential highlighting might be applied, the query could be a block of text. This is the case in certain implementations of sentiment analysis, where embedding representations of text are compared to reference embedding representations to ascertain the overall mood portrayed in the text. In this embodiment, the perturbation unit modifies the query by making minor edits to the text. The modified text is sent to the objective calculator for calculating the objective value with respect to each of the perturbations. The optimizer sends the edit or edits associated to the largest objective value to the output unit, which in turn presents the maximal edits to the user. This helps the user understand which parts of the text block are most important in the comparison between the text block and the reference embedding representation in the embedding space. This interpretation is of further value when the reference embedding representation itself has semantic value, either because it is produced by applying the embedding mapping to a reference text block, or because it represents a characteristic sentiment such as happy, sad, positive, negative, and so forth.

Figure 5:
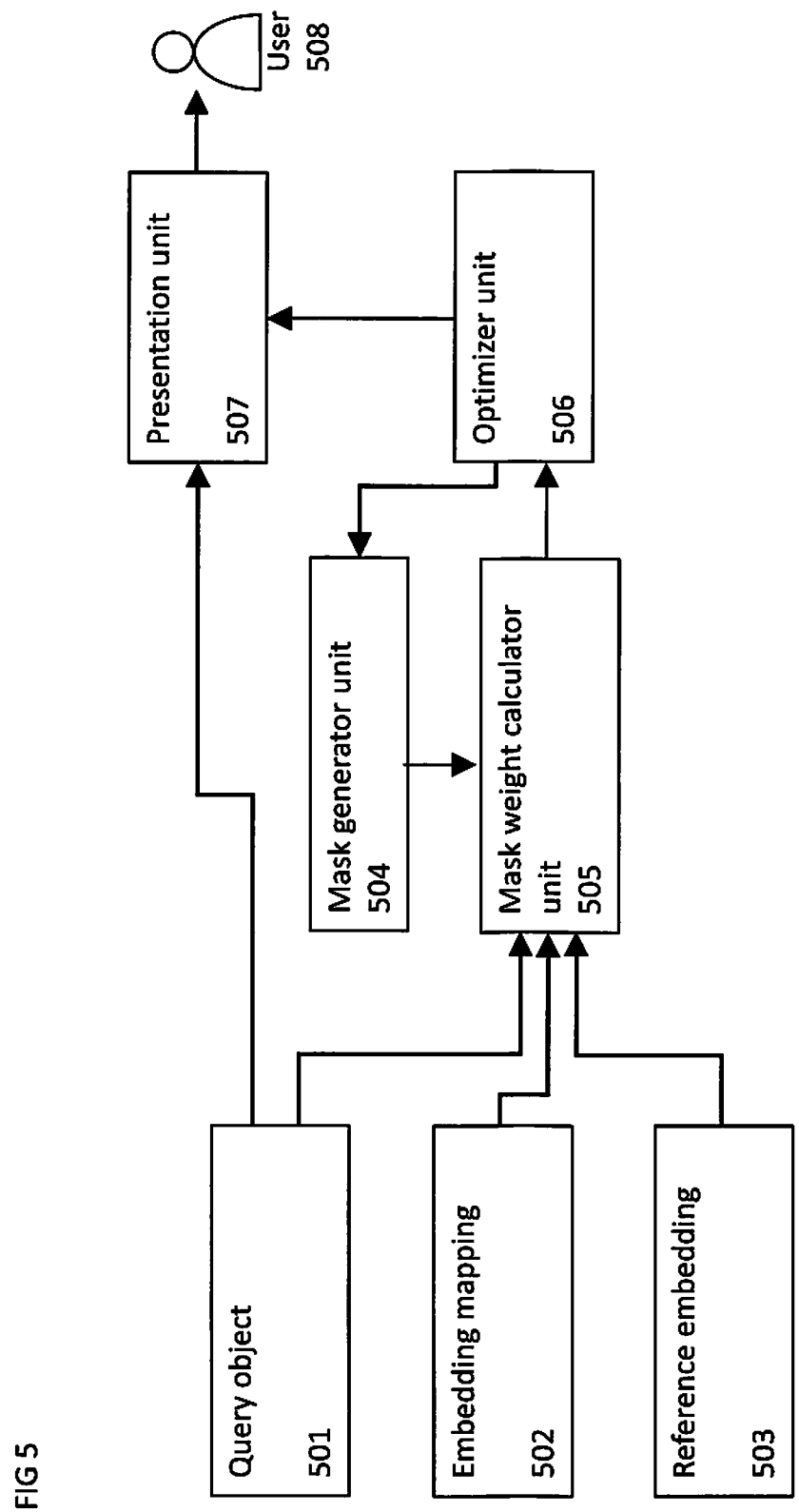
FIG. 5 depicts how the invention calculates the differential highlights of a query object in the case where the highlights are composed of differential masks.

In another embodiment, depicted in FIG. 5, the instance object space is itself a Euclidean vector space, and the masking approach is used. In this embodiment, the query object 501, the embedding mapping 502 and the reference embedding representation 503 are all combined in the mask weight calculator 505. In addition, the mask generator 504 supplies differential masks $\{\delta m_s\}$ to the mask weight calculator. For each differential mask, the mask weight calculator uses the query object, the embedding mapping and the reference embedding representation to compute a mask weight $\alpha_s^* = u^T(F(x+x \, \delta m_s) - F(x))$. The mask calculator 506 combines the mask weights with the differential masks, sending the optimal mask to the presentation unit 507 which presents the optimal mask and, optionally, the original query object, to the user 508 via the presentation device.

In context of taking the instance object space as a Euclidean vector space, and the perturbations as differential masks, various embodiments correspond to different methods by which masks are chosen. In one embodiment, masks are chosen randomly, such that each mask amplifies or diminishes a different set of arbitrary components of the query object. Masks can be randomized arbitrarily, without regard for the application domain, or masks can be chosen randomly, but with bias towards certain meaningful elements of the query object. For example, if the query object is an image, the masks may be chosen to apply randomly, but only to a central area of the image where it might be assumed that important image information is represented. In another embodiment, masks might be chosen according to the statistics of the instance object space, for example, as leading components of a dimensionality reduction technique, principal component analysis (PCA) being a well-known example. Masks may also be chosen exhaustively, such that the masks together form a basis or even an overdetermined frame over the instance object space. These choices may make sense if the instance object space is a low-dimensional space.

Figure 6:
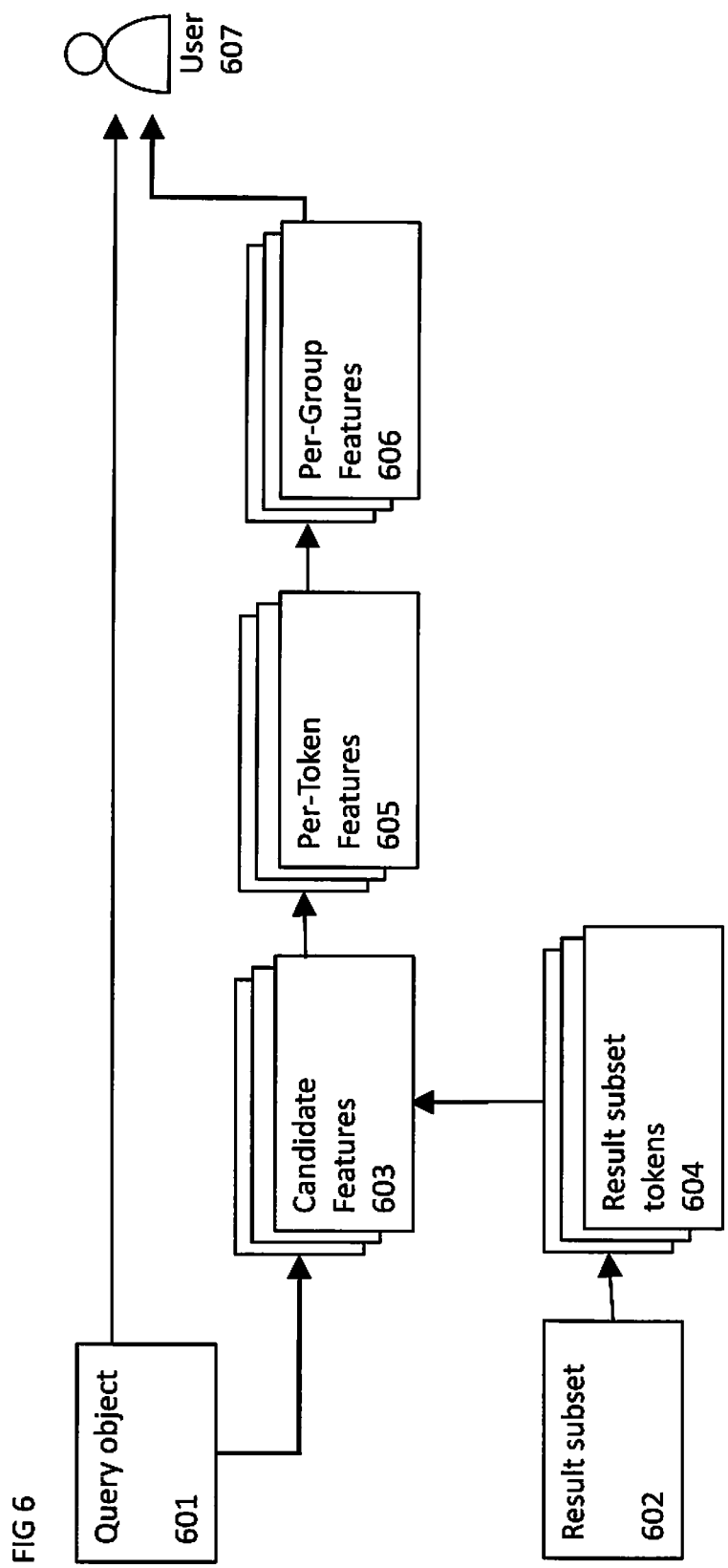
FIG. 6 depicts how the invention calculates and presents to a user which features of a query object are important to the query's similarity to a set of result objects.

FIG. 6 illustrates an embodiment implementing how features of a query object that are important to its match to a set of result objects may be combined. Candidate features 603 of a query object 601 are selected by a perturbation unit or a mask generator. Tokens 604 of result objects in a result set 602 are referred back to their reference embeddings, and either of the operations depicted in FIG. 4 or FIG. 5 is applied to determine the feature sensitivities or aggregate masks of the query object for each token. These sensitivities or masks are the per-token feature 605. The sensitivities or masks are then combined over all tokens in the result set, using a foreground-background score of each token with respect to the result set. These per-set features 606 are presented to the user 607 in context of the original query object.

Application Embodiments

Some embodiments admit natural methods for presenting maximal perturbations for the user. For example, if the query object is an audio clip, the clip might be presented by playing the audio back through a speaker, or as a visually displayed plot of the audio clip waveform. In such case, masks might represent temporal sections of the clip, and the optimal mask as a rise in playback loudness or as a shading over the waveform that varies in the time dimension. Alternatively, audio clips may be displayed by its frequency spectrum, with masks representing frequency components of the audio signal, and the optimal mask represented as a shading over frequency bands that are important to the matching of the query object to the reference embedding representation. Alternatively, audio clips may be displayed by a time-frequency spectrogram, where masks identify with frequency components over specific time periods, and optimal differential masks explain why the query matches a reference embedding representation by highlighting important time-frequency regions over the query.

Although a variety of applications might benefit from explanations of good audio matches, a particular application is presenting specific utterances that are important to the nearest neighbour matching of audio clips of speech. With an embedding mapping that has, for example, been trained to determine identical words in audio clips from different speakers to be similar, our invention explains which temporal, spectral, or temporo-frequency components of speech help ground human listeners as they understand different speakers.

In other embodiments, the object may be a 2-dimensional or 3-dimensional image, and differential masks are shadings over pixels or voxels, respectively. The optimal mask for a query object's match to a reference embedding representation is a spatial density, represented as a shading over the original query. The shading thus explains which regions of the image are important to the match.

In some embodiments, the reference embedding representation may be the result of applying the embedding mapping to a reference object. In this case, the explanation inferred is that the optimal perturbation of the query object explains why the query and reference objects have the similarity computed when comparing their embedding representations. This is pertinent, for example, when the reference object is a result of a nearest neighbour search, and the similarity between the query and reference objects is large.

In some embodiments, the reference embedding representation is not the output of applying the embedding mapping to any single reference object but is a combination of several reference object embedding representations. This is the case, for example, when a nearest neighbour search determines that the query object is similar to a set of result objects from a nearest neighbour search, and the result object embedding representations of the result set are combined into one reference embedding representation. In this instance, the optimal perturbation of the query object explains which elements of the query object are most important in affecting the match to the set of result objects.

The invention claimed is:

1. A computer-implemented method for providing human-interpretable explanation to output results from a machine learning decision process, said method comprising the following steps performed by a data processing apparatus:

using a tokenizing function, computing query tokens representing a query object (105) being subjected to said machine learning decision process;

accessing a database in which there are stored representative tokens derived, using said tokenizing function, from an assembled corpus of reference objects that are of a same type as said query object, and are therefore useful to provide explanation of semantic features of said query object;

querying said database for identification from among the corpus of reference objects any result objects (110) that each share at least one common token with the query object, the identified result objects thereby forming a subset of the corpus of reference objects;

assessing similarity between the query object and each identified result object in said subset of the corpus of reference objects based on said at least one common token;

grouping the identified result objects of said subset of the corpus of reference objects into at least one result set (305);

sorting the identified result objects within each result set in decreasing order of similarity to the query object;

from among the at least one sorted result set, selecting a collection of reference objects of high-ranking similarity to the query object; and causing presentation, to a user, of said collection of identified reference objects alongside the query object such that the semantic features of the query object are easily comparable by said user to the semantic features of each of the identified reference objects in said collection, thereby explaining important semantic features of the query object that contributed to the output results from the machine-learning decision process;

wherein:
each reference object is provided with at least one label;
the step of grouping the identified result objects into said at least one result set comprises:
  grouping the identified result objects into multiple result sets according to the labels of said identified result objects;
  computing a score for each of said multiple result sets according to a plurality of similarities between each grouped result object and the query object; and
  using said scores, identifying one or more high-scoring sets from which the collection of reference objects of high-ranking similarity to the query object are subsequently selected; and
the method further comprises:
  presenting the label possessed by the identified result objects of each of said one or more high-scoring result sets as a candidate label for the query object; and
  the collection of reference objects selected from the one or more high-scoring sets serve as explanations for each candidate label for the query object (301).

2. The method of claim 1 wherein the tokenizing function (102) comprises:
mapping from interest objects to a Euclidean space by an embedding mapping (202); and
mapping from Euclidean space to a space of tokens by a locality sensitive hash function (203).

3. The method of claim 1 wherein the score of each of said multiple result sets is a foreground-background score thereof with respect to the tokens of the result objects therein.

4. The method of claim 1 wherein features of the query object that are in common with each result set are used to explain the reason for the query object's correspondence to the result set, by:
selecting candidate features (603) for the query object (601);
collecting and scoring the reference tokens (205) for each of said multiple result sets;
calculating feature sensitivities of the query object with respect to reference embedding of each reference token (604) over all of the high-scoring result sets and each candidate feature, thereby determining candidate sensitivities for each reference token;
combining the candidate features into a single feature for each reference token (605) according to the candidate sensitivities for each reference token;
calculating aggregate features (606) for each result set by combining the single features for each reference token with the score of said reference token with respect to each result set; and
presenting the aggregate features for each result set in context of the query object as an explanation for components of the query object important to its match with each result subset.

5. The method of claim 4 wherein:
the tokenizing function (102) comprises:
  mapping from interest objects to a Euclidean space by an embedding mapping (202); and
  mapping from Euclidean space to a space of tokens by a locality sensitive hash function (203); and
  the locality sensitive hash function is a linear transform with simple thresholding, and the feature sensitivities of the query objects with respect to each reference token and each candidate feature is computed by differential highlighting.

6. The method of claim 5 wherein the interest objects are images, differential masks are computed by said differential highlighting, and the differential masks are candidate regions of interest in the images.

7. The method of claim 5 wherein the interest objects are audio recordings, differential masks are computed by said differential highlighting, and the differential masks are candidate time periods of interest in the audio recordings.

8. The method of claim 5 wherein the interest objects are text samples, differential masks are computed by said differential highlighting, and the differential masks are candidate characters in the text samples.

9. Non-transitory computer readable memory having stored thereon statements and instructions executable by one or more computer processors to perform the method of claim 1.

10. A system for providing human-interpretable explanation to output results from a machine learning decision process, the system comprising a data processing apparatus comprising one or more processors connected or communicable with a data store and a presentation device, and one or more non-transitory computer readable media having stored thereon statements and instructions executable by said one or more processors to perform the following steps:
using a tokenizing function, computing query tokens representing a query object (105) being subjected to said machine learning decision process;
accessing said data store, in which there are stored representative tokens derived, using said tokenizing function, from an assembled corpus of reference objects that are of a same type as said query object, and are therefore useful to provide explanation of semantic features of said query object;

querying said data store for identification from among the reference objects any result objects (110) that each share at least one common token with the query object, the identified result objects thereby forming a subset of the corpus of reference objects;

assessing similarity between the query object and each identified result object in said subset of the corpus of reference objects based on said at least one common token;

grouping the identified result objects of said subset of the corpus of reference objects into at least one result set (305);

sorting the identified result objects within each result set in decreasing order of similarity to the query object;

from among the at least one sorted result set, selecting a collection of reference objects of high-ranking similarity to the query object; and causing presentation, on said presentation device, of said collection of identified reference objects alongside the query object such that the semantic features of the query object are easily comparable by said user to the semantic features of each of the identified reference objects in said collection, thereby explaining important semantic features of the query object that contributed to the output results from the machine-learning decision process;

wherein the statement and instructions are configured such that:

each reference object is provided with at least one label;

the step of grouping the identified result objects into said at least one result set comprises:

grouping the identified result objects into multiple result sets according to the labels of said identified result objects;

computing a score for each of said multiple result sets according to a plurality of similarities between each grouped result object and the query object; and using said scores, identifying one or more high-scoring sets from which the collection of reference objects of high-ranking similarity to the query object are subsequently selected; and the steps further comprise:

causing presentation, via the presentation device, of the label possessed by the identified result objects of each of said one or more high-scoring result sets as a candidate label for the query object; and the collection of reference objects selected from the one or more high-scoring sets serve as explanations for each candidate label for the query object (301).

11. The system of claim 10 wherein the statement and instructions are configured such that the tokenizing function (102) comprises:

mapping from interest objects to a Euclidean space by an embedding mapping (202); and mapping from Euclidean space to a space of tokens by a locality sensitive hash function (203).

12. The system of claim 10 wherein the statements and instructions are configured such that the score of each label subset is a foreground-background score of the subset with respect to the tokens of the subset's result objects.

13. The system of claim 10 wherein features of the query object that are in common with each result object subset explain the reason for its correspondence to the result object subset, and wherein the statement and instructions are therefore configured to:

select candidate features (603) for the query object (601);

collect and score the reference tokens (205) for each of said multiple result sets;

calculate feature sensitivities of the query object with respect to reference embedding of each reference token (604) over all of the high-scoring result sets and each candidate feature, thereby determining candidate sensitivities for each reference token;

combine the candidate features into a single feature for each reference token (605) according to the candidate sensitivities for each reference token;

calculate aggregate features (606) for each result set by combining the single features for each reference token with the score of said reference token with respect to each result set; and present, via the presentation device, the aggregate features for each result set in context of the query object as an explanation for components of the query object important to its match with each result subset.

14. The system of claim 13 wherein the statements and instructions are configured such that:

the tokenizing function (102) comprises:

mapping from interest objects to a Euclidean space by an embedding mapping (202); and mapping from Euclidean space to a space of tokens by a locality sensitive hash function (203); and the locality sensitive hash function is a linear transform with simple thresholding, and the feature sensitivities of the query objects with respect to each token and each candidate feature are computed by differential highlighting.

15. The system of claim 14 wherein the interest objects are images, and the statements and instructions are configured such that differential masks are computed by said differential highlighting, and are candidate regions of interest in the images.

16. The system of claim 14 where the interest objects are audio recordings and the statements and instructions are configured such that differential masks are computed by said differential highlighting, and are candidate time periods of interest in the audio recordings.

17. The system of claim 14 where the interest objects are text samples, and the statements and instructions are configured such that differential masks are computed by said differential highlighting, and are candidate characters in the text samples.

* * * * *